United States Patent
Broadbent

(10) Patent No.: US 9,360,117 B2
(45) Date of Patent: Jun. 7, 2016

(54) SEAL

(71) Applicant: Thomas Broadbent, Glossop (GB)

(72) Inventor: Thomas Broadbent, Glossop (GB)

(73) Assignee: AES Engineering Ltd., Rotherham (GB)

( * ) Notice: Subject to any disclaimer, the term of this patent is extended or adjusted under 35 U.S.C. 154(b) by 0 days.

(21) Appl. No.: 14/647,325

(22) PCT Filed: Nov. 22, 2013

(86) PCT No.: PCT/GB2013/000510
§ 371 (c)(1),
(2) Date: May 26, 2015

(87) PCT Pub. No.: WO2014/080163
PCT Pub. Date: May 30, 2014

(65) Prior Publication Data
US 2015/0300500 A1    Oct. 22, 2015

(30) Foreign Application Priority Data
Nov. 23, 2012 (GB) .................................. 1221116.5

(51) Int. Cl.
*F16J 15/36* (2006.01)
*F16J 15/34* (2006.01)
*F16J 15/38* (2006.01)

(52) U.S. Cl.
CPC ............ *F16J 15/344* (2013.01); *F16J 15/3452* (2013.01); *F16J 15/3464* (2013.01); *F16J 15/38* (2013.01)

(58) Field of Classification Search
CPC ....... F16J 15/34; F16J 15/3436; F16J 15/344; F16J 15/3452; F16J 15/3464
See application file for complete search history.

(56) References Cited

U.S. PATENT DOCUMENTS

| 3,897,957 | A | | 8/1975 | Warner | |
|---|---|---|---|---|---|
| 4,558,872 | A | * | 12/1985 | Vossieck | ................. F16J 15/36 277/379 |
| 4,832,351 | A | * | 5/1989 | Ciotola | ................ F16J 15/3464 277/358 |
| 6,220,601 | B1 | * | 4/2001 | Keller | ...................... F16J 15/36 277/381 |
| 2002/0096834 | A1 | * | 7/2002 | Hadley | .................. F16J 15/348 277/358 |

FOREIGN PATENT DOCUMENTS

| DE | 19 29 323 A1 | 12/1970 |
|---|---|---|
| GB | 1104318 A | 2/1968 |

* cited by examiner

*Primary Examiner* — Gilbert Lee
(74) *Attorney, Agent, or Firm* — Edwin D. Schindler

(57) ABSTRACT

A mechanical seal for providing a fluid-tight seal between relatively rotatable elements includes a stationary part for securing to a housing, which has a stationary seal face, a rotary part for securing to a shaft, which includes a rotary seal face, a spring urging the rotary seal face into engagement with the stationary seal face and a toroidal sealing member between the rotary component and the shaft. The toroidal sealing member is accommodated within a recess of the rotary part, and the recess is defined by two members of which the first rotary part member includes the seal face and a second rotary part member is positioned between the first rotary part member and the spring.

9 Claims, 4 Drawing Sheets

SEAL

FIELD OF INVENTION

The invention relates to a mechanical seal, which may be fitted to rotating equipment in virtually all types of industries.

BACKGROUND TO INVENTION

A mechanical seal comprises a "floating" component which is mounted axially movable around the rotary shaft of, for example, a pump or a "static" component which is axially fixed, typically being secured to a housing. The floating component has a flat annular end face, i.e. its seal face, directed towards a complementary seal face of the static component. The floating component is urged towards the static component to close the seal faces together to form a sliding face seal, usually by means of one or more spring members. In use, one of the floating and static components rotates; this component is therefore referred to as the rotary component. The other of the floating and static components does not rotate and is referred to as the stationary component.

Those seals whose floating component is rotary are described as rotary seals. If the floating component is stationary, the seal is referred to as a stationary seal.

If the sliding seal between the rotary and stationary components are assembled and pre-set prior to despatch from the mechanical seal manufacturing premises, the industry terminology for this is "cartridge seal". If the rotary and stationary components are despatched individually (unassembled) from the mechanical seal manufacturing premises, the industry terminology for this is "component seal".

The present invention relates to component seals, which can be used in numerous applications and with various products. The sale of the products is price sensitive due to the relatively simple and common technology used. For this reason, modularity use of the same components in different seals in the design is a key way of reducing the associated costs of manufacturing and stocking of parts. For this reason it is important that particular components can be replaced with ones of a differing material to allow it to be used in a different application.

In the case of o-rings, which are used in the mechanical seals to provide a seal between the mechanical seal and the pump components, modularity can be hindered if the rigidity of the material that is required for the o-ring does not allow it to be fitted into the component which it resides.

STATEMENTS OF INVENTION

The invention provides to a mechanical seal for providing a fluid-tight seal between relatively rotatable elements, the seal comprising:
a stationary part for securing to a housing, which comprises a stationary seal face;
a rotary part for securing to a shaft, which comprises a rotary seal face;
a spring urging the rotary seal face into engagement with the stationary seal face; and
a toroidal sealing member between the rotary component and the shaft;
wherein the toroidal sealing member is accommodated within a recess of the rotary part, and
wherein the recess is defined by two members of which the first rotary part member comprises the seal face and a second rotary member part is positioned between the first rotary part member and the spring.

The use of a two-member rotary part allows the pressure provided by the spring in urging the seal faces together to be isolated from the toroidal sealing member, or o-ring. The effect of this is that the o-ring is not deformed due to pressure from the spring member and thus a relatively stiff o-ring can be used. The second rotary part, or "spring plate", protects the o-ring and can thereby allow a better quality seal to be created without the risk of the o-ring being damaged by the force provided by the spring. The first rotary part and the rotary seal face may be integrally formed or may comprise separate parts connected to one another.

The first rotary part may be provided with a ledge, which the second rotary part contacts and presses against, when forced towards the first rotary part by the spring. The second rotary part has a larger diameter than the internal diameter of the ledge, such that it cannot pass within the open diameter of the ledge. On the opposite side of the second rotary part to that upon when the spring acts, a recesses region is formed in the first rotary part to accept the o-ring. Thus, the second rotary part cannot apply pressure to the o-ring.

Preferably, the second rotary part member is a cylindrical plate or ring.

Preferably, second rotary member part is in abutting relationship with an edge or stepped portion of the first rotary member part.

Preferably, the first rotary member part provides the outer wall of the recess which has an internal diameter sufficient to squeeze the toroidal member to provide an adequate seal. More preferably, the squeeze is such as to compress the toroidal member by about 10%.

Preferably, the second rotary part member is urged towards the first rotary part member by the spring.

Preferably the spring is of tapered profile allowing resistance on the shaft to provide axial drive to the rotary components.

The tapered spring preferably positively locates into a radial hole in the rotary component.

DETAILED DESCRIPTION

The invention will now be described, by way of example only, with reference to the accompanying drawings.

Figure 1:
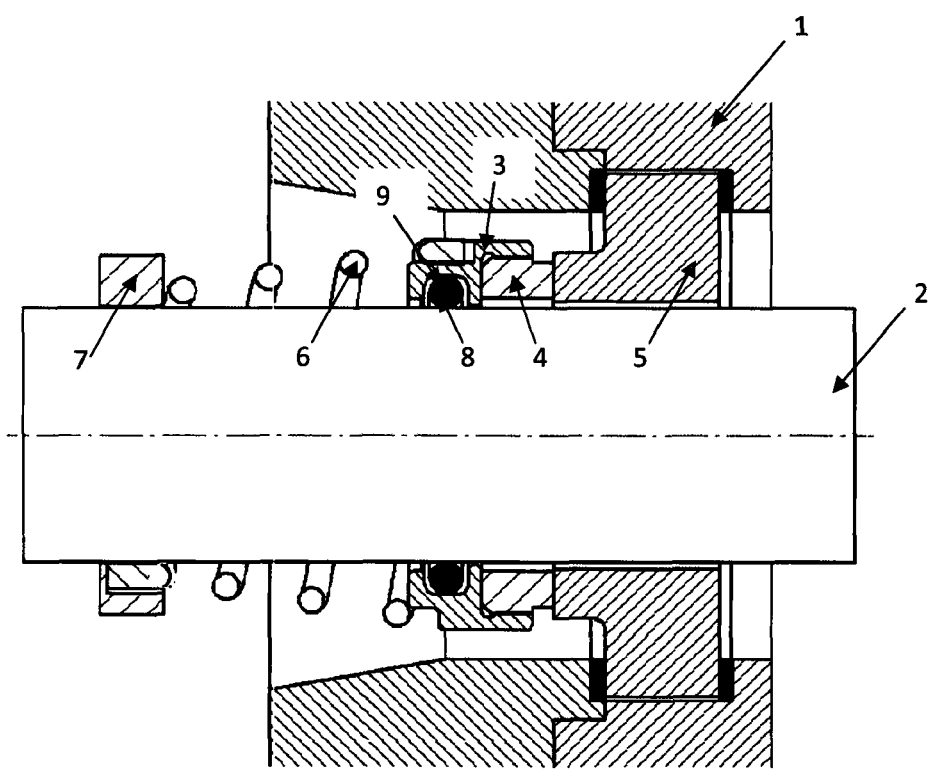
FIG. 1 shows a cross-sectional view of a prior art tapered spring component seal with machined o-ring groove.

The prior art single component mechanical seal partially shown in FIG. 1 provides a mechanical seal between a stationary housing 1 and a rotating shaft 2. The mechanical seal includes a rotary holder 3, in which resides a rotary sealing face 4. The rotary sealing face 4 and rotary holder 3 are axially urged towards a stationary sealing face 5 via a spring of tapered profile 6. The tapered spring 6 comes into contact with the shaft 2 via a clamping member 7 which ensures that axial rotation is transferred from the shaft 2 to the rotary components. An o-ring 8 is located in the rotary holder groove 9 and provides a fluid seal between the rotary holder 3 and the shaft 2. In the mechanical seal the tapered spring 6 positively locates into a slot residing in the rotary holder 3 ensuring that axial rotation is transferred from the tapered spring 6 to the rotary holder 3 and the rotary face 4.

Figure 2:
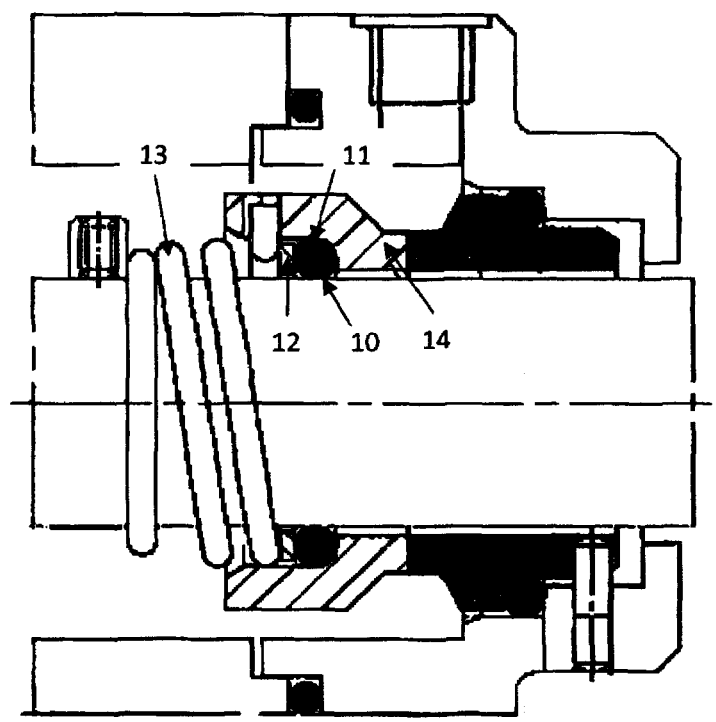
FIG. 2 shows a cross-sectional view of a prior art tapered spring component seal with a spring plate between the rotary o-ring and spring.

The prior art single component mechanical seal partially shown in FIG. 2 embodies the same components as FIG. 1 however, the rotary o-ring 10 resides in an open ended groove 11 in which a cylindrical member 12 resides between the tapered spring 13 and the rotary face 14.

Figure 3:
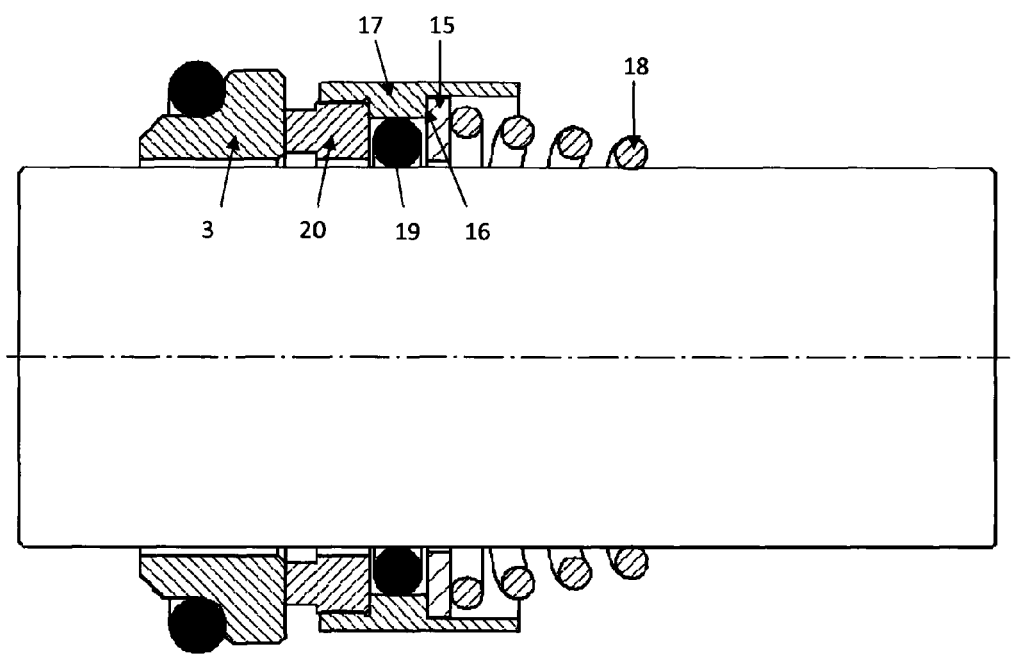
FIG. 3 shows a cross-sectional view of a seal in accordance with the present invention with a fitted face.

The preferred embodiment of the invention partially shown in FIG. 3 embodies the same components as FIG. 1 and FIG. 2 however, the cylindrical member 15 is located against a ledge profile 16 in the rotary holder 17. The ledge profile 16 is diametrically smaller than the outer diameter of the cylindrical member 15 ensuring that the tapered spring 18 does not cause the sealing rotary o-ring 19 to be axially compressed.

Figure 4:
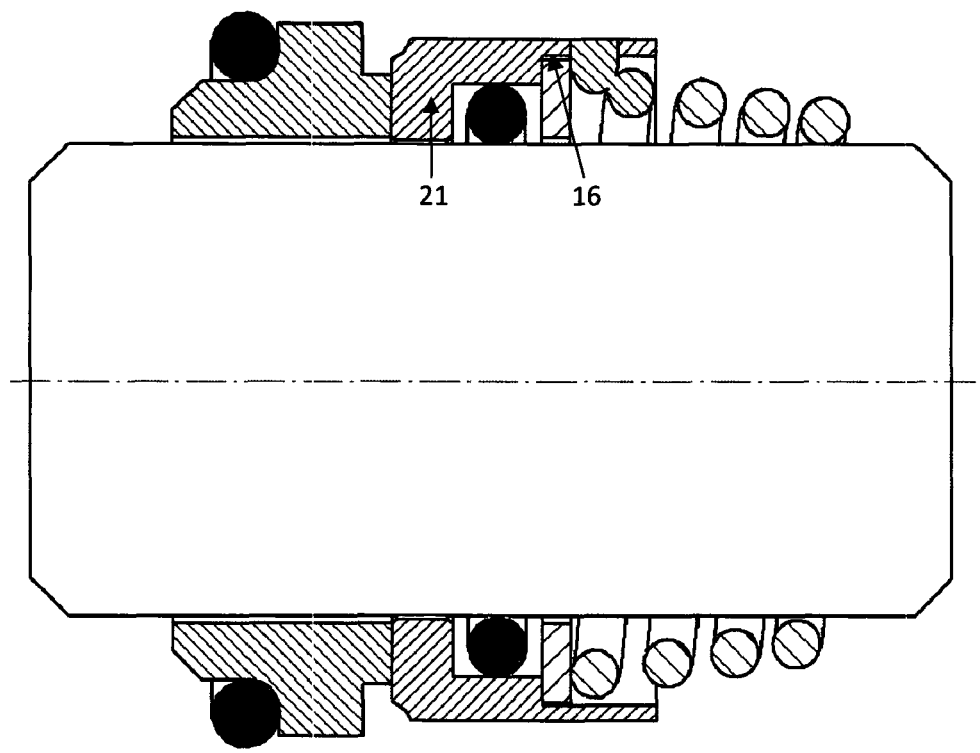
FIG. 4 shows a cross-sectional view of a seal in accordance with the present invention with a monolithic face.

The alternative embodiment of the invention partially shown in FIG. 4 utilises the same components as the primary embodiment partially shown in FIG. 3, however the rotary seal face 20 and the rotary holder 17 are manufactured from a single member 21. In order to allow modularity, i.e. the same spring 18 and spring plate 15, between the embodiments of the present invention the same ledge profile 16 in the rotary component is used.

The contents of GB1221116.5, filed on 23 Nov. 2012, is hereby incorporated by reference.

The invention claimed is:

1. A mechanical seal for providing a fluid-tight seal between relatively rotatable elements, comprising:
    a stationary part for securing to a housing comprises a stationary seal face;
    a rotary part for securing to a shaft comprises a rotary seal face;
    a spring urging the rotary seal face into engagement with the stationary seal face; and
    a toroidal sealing member between a rotary component and the shaft,
    wherein the toroidal sealing member is accommodated within a recess of the rotary part, and wherein the recess is defined by two members of which the first rotary part member comprises the seal face and a second rotary member part is positioned between the first rotary part member and the spring, the first rotary part member having a stepped portion and the second rotary part member having a radially outer portion abutting the stepped portion of the first rotary part member for permitting the spring to be in direct driving engagement with the first rotary part member.

2. The mechanical seal according to claim 1, wherein the first rotary part and the seal face are integral.

3. The mechanical seal according to claim 1, wherein the first rotary part and the seal face are separate parts and are connected to one another.

4. The mechanical seal according to claim 1, wherein the second rotary part member is a cylindrical plate or ring.

5. The mechanical seal according to claim 1, wherein the first rotary part member provides an outer wall to the recess, an internal diameter of the outer wall of the first rotary part being sufficient for applying pressure to the toroidal member for providing a seal.

6. The mechanical seal according to claim 5, wherein the pressure is sufficient for compressing the toroidal member by substantially 10%.

7. The mechanical seal according to claim 1, wherein the second member rotary part member is urged towards the first rotary member part by the spring.

8. The mechanical seal according to claim 1, wherein the spring has a tapered profile, thereby allowing resistance on the shaft to provide axial drive to the rotary part.

9. The mechanical seal according to claim 8, wherein the spring positively locates into a radial hole provided in the rotary part.

* * * * *